United States Patent [19]
Clements

[11] 3,739,198
[45] June 12, 1973

[54] CAPACITOR FIRED THYRISTOR

[75] Inventor: Ralph E. Clements, Loves Park, Ill.

[73] Assignee: Barber-Colman Company, Rockford, Ill.

[22] Filed: June 21, 1972

[21] Appl. No.: 264,783

[52] U.S. Cl. .... 307/252 B, 307/252 Q, 307/252 F, 318/345
[51] Int. Cl. .......................................... H03k 17/00
[58] Field of Search ................... 307/252 B, 252 N, 307/252 Q, 252 F; 318/345

[56] References Cited
UNITED STATES PATENTS
3,688,130  8/1972  Granieri............................. 307/252
3,553,495  1/1971  Shaugnessy ..................... 307/252 B

OTHER PUBLICATIONS

Adem; "Solid State Ring Counters and Chasers for Light Displays"; 9/67; pp. 84–85.

Spofford; "The D13T -A Programmable Unijunction Transistor"; 11/67, pp. 1, 2, 6, 7.

Primary Examiner—J. D. Miller
Attorney—A. Richard Koch

[57] ABSTRACT

A capacitor is discharged through the control circuit of a thyristor to positively render the thyristor conductive.

10 Claims, 3 Drawing Figures

Patented June 12, 1973 3,739,198

CAPACITOR FIRED THYRISTOR

BACKGROUND OF THE INVENTION

This invention is concerned with firing circuits for thyristors to provide phase angle control of current through a controlled circuit.

In many applications, such as in the fan speed control circuit described herein, it has been desirable to control the effective current through a load by phase angle control of the firing of a series connected thyristor. The firing phase angle is determined in response to a sensed condition such as room temperature, which changes slowly and within a narrow range.

Eric I. Siwko and William F. Saunders in U.S. Pat. No. 3,474,293, issued on Oct. 21, 1969, disclosed in FIG. 2 a somewhat similar thyristor firing circuit for suppressing the arc created when a pair of circuit controlling contacts are opened or closed. The switch carried the load current. They said it was unsatisfactory because the thyristor could be fired by transients on the line.

SUMMARY OF THE INVENTION

This invention covers a thyristor firing circuit connected in parallel with the thyristor and drawing operating current through a series connected controlled load from a source of pulsating current, the thyristor and its firing circuit thus requiring only two connecting wires without regard to order of connection. The operating current of the firing circuit is insufficient to energize the load, but a high step current at a precisely determined time during each pulse assures positive firing of a thyristor to energize the load. A low cost controller is possible through use of low voltage components without the need for a transformer.

This invention differs from Siwko et al. in that the thyristor carries the load current and by firing the thyristor at a predetermined phase angle in each pulse of a series of pulses rather than at unpredictable angles during the opening and closing of a protected load current carrying switch. The firing circuit according to this invention does not carry load current.

DESCRIPTION OF THE PREFERRED EMBODIMENT

Figure 1:
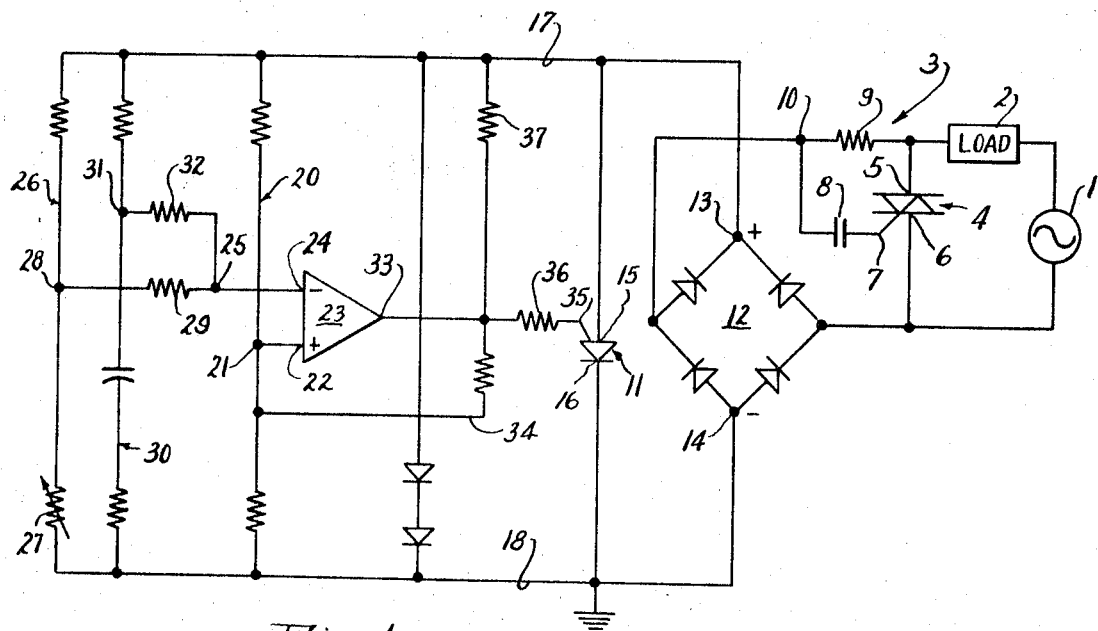
FIG. 1 is a schematic circuit diagram of a preferred embodiment of this invention and its application.

A pulsating current source 1 (shown in FIG. 1 as an alternating current source), a load 2, and a controller 3 are connected in series in a controlled circuit. A thyristor 4 (shown as a triac) in controller 3 had a power terminal 5 and a common terminal 6 connecting said thyristor in the series controlled circuit. In a firing circuit for the triac, the control terminal 7 is connected through a capacitor 8 and a current limiting means 9 (shown as resistor) to power terminal 5, a junction 10 between capacitor 8 and resistor 9 being connected through a phase angle triggered switching means 11 (shown as a controllable semiconductor switch known as a programmable unijunction transistor and hereinafter referred to as a PUT) to the common terminal 6. A rectifier bridge 12 is employed to convert the alternating current into pulsating direct current at positive (+) and negative (−) terminals 13, 14 which are connected to the anode 15 and cathode 16 of PUT 11 and to the positive (+) and negative (−) conductors 17, 18 leading to the trigger means for the PUT 11. A reference voltage divider 20, connected between conductors 17, 18, provides a reference voltage at its tap 21 for the non-inverting input terminal 22 of an operational amplifier 23. The inverting input terminal 24 is connected to a summing junction 25. A condition sensitive voltage divider 26, connected between conductors 17, 18 and comprising a condition sensitive resistor 27 (shown as a variable resistor), has its tap 28 connected through a scaling resistor 29 to summing junction 25. A sawtooth wave generating means (shown as a voltage divider 30), connected between conductors 17, 18, has its terminal 31 connected through scaling resistor 32 to summing junction 25. The output terminal 33 is joined to the non-inverting input terminal 22 through a positive feedback circuit 34, to the gate 35 of the PUT 11 through resistor 36 and to anode 15 through resistor 37.

Figure 2:
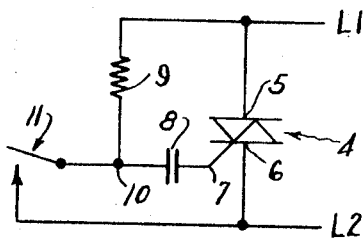
FIG. 2 is a schematic curcuit diagram showing the basic elements of the invention as employed in firing a bidirectional thyristor, as in FIG. 1.

The operation of the firing circuit is more easily understood by reference to FIG. 2, which shows only the thyristor and its firing circuit. Let us first assume that line L1 is positive (+) and line L2 is negative (−), that triac 4 is non-conducting, and that switching means 11 is open. A charging current will then flow from line L1 through limiting resistor 9 to capacitor 8 and from capacitor 8 through the triac 4 between the control and common terminals 7, 6 to line L2. This current is limited by capacitor 8 and resistor 9, separately or in combination, to such an extend that it will not fire the triac 4, but will charge the capacitor 8. If the switch 11 is then closed, the capacitor 8 is discharged through switch 11 and triac 4 between the common and control terminals 6, 7 to fire the triac. Firing occurs because the capacitor discharge current is not limited, providing a sharp spike of current that positively fires the triac. When the triac 4 is fired, it conducts current between its power and common terminals 5, 6, substantially producing a short circuit between L1, L2 to disable the firing circuit. The triac continues to conduct current until the voltage difference between lines L1, L2 falls substantially to zero. Let us now assume that line L2 is positive (+) and line L1 is negative (−), that triac 4 is non-conducting, and that switching means 11 is open. A charging current will then flow from line L2 through triac 4 between the common and control terminals 6, 7 to capacitor 8 and from capacitor 8 through limiting resistor 9 to line L1. Again the charging current is limited by capacitor 8 and resistor 9, separately or in combination, to prevent firing of the triac. If the switch 11 is then closed, the capacitor 8 is discharged through triac 4 between the control and common terminals 7, 6 and switch 11 to fire the triac, which produces a substantially short circuit between lines L2, L1 to disable the firing circuit. The triac continues to conduct current until the voltage between lines L2, L1 falls substantially to zero.

The firing circuit in FIG. 1 operates in the same manner as described above with the exception that, because the PUT 11 will conduct current in only one direction, the bridge 12 is provided to convert current in either direction to the required one direction, and, instead of completing a circuit between lines L1, L2, the triac 4 completes the controlled circuit through current source 1 and load 2. The trigger means for the PUT 11 receives current from the rectifying bridge 12 through conductors 17, 18, the current drawn by both the charging capacitor and the trigger means being insufficient to energize the load. The resistor 9 serves the additional function of providing a reduced voltage to conductors 17, 18 and so permitting use of less expensive components in the trigger means, the bridge 12, PUT 11 and capacitor 8. The reference voltage divider 20 provides a predetermined reference voltage at tap 21 and non-inverting input terminal 22. The condition sensitive voltage divider 26 provides condition variable voltage at its tap 28, and the sawtooth wave generating means 30 produces at terminal 31 a time variable voltage. The sawtooth voltage produced by generating means 30 is synchronized with the current pulses in conductors 17. The condition and time variable voltages are summed through their respective scaling resistors 29, 32 at summing junction 25, which is connected to the inverting input terminal 24. When the summed voltage applied to inverting input terminal 24 is less than the reference voltage applied to non-inverting input terminal 22, the output voltage at output terminal 33 will be above the reference voltage, and, when the summed voltage is more than the reference voltage, the output voltage will be below the reference voltage. Because of the positive feedback circuit 34, the output voltage, when it is higher than the reference voltage, will be at substantially the same voltage as the conductor 17, and, when it is lower than the reference voltage, will be at substantially the same voltage as conductor 18. Since a PUT will conduct only when the gate is negative in potential with respect to the anode, it will be seen that in order for PUT 11 to become conductive the output voltage applied to gate 35 must be lower than the voltage applied to anode 15 by conductor 17, or only when the output voltage is at the potential of conductor 18. In order to produce this condition, the summed voltage applied to inverting input terminal 24 must be greater than the reference voltage applied to non-inverting input terminal 22. This condition is most likely to occur toward the end of a current pulse when the time variable voltage is higher, but the actual time during the pulse at which it occurs will be dependent upon the more slowly varying value of the condition variable voltage. Triggering of the PUT 11 may occur at substantially any time during a current pulse. Triggering during each pulse may be assured as by producing a maximum sawtooth voltage higher than the reference voltage, or by any other means for producing a summed voltage higher than the reference voltage.

Figure 3:
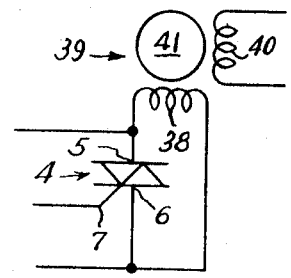
FIG. 3 shows the firing circuit controlling a shaded pole motor, as in a fan speed control.

FIG. 3 demonstrates that the controlled circuit may combine the load and current source as in the shading coil 38 of a shaded pole motor 39, having its primary winding 40 continuously energized by alternating current from a source not shown. In such an application the speed of the rotor 41 is controlled by the effective value of the current permitted to flow through the shading coil 38 as a result of the phase angle firing of triac 4.

It will be noted that the thyristor is fired by firing current flowing through the common terminal in opposite direction to the controlled current. Although a triac (a bidirectional thyristor) has been used in the preferred circuit, any thyristor that may be fired by a firing current flowing through the common terminal in opposite direction to the controlled current may be employed. While an alternating current, as in the description, is most commonly controlled, it will be obvious that a pulsating direct current could also be controlled as long as it became substantially zero between pulses. The scope of this invention is limited only by the claims.

I claim:

1. A firing circuit for a load current controlling thyristor having power, control and common terminals, said firing circuit comprising a capacitor connected in parallel with said thyristor between the power and control terminals, and phase angle triggered switching means connected in series with the capacitor between said control and common terminals to selectively discharge the capacitor.

2. A firing circuit according to claim 1 wherein said phase angle triggered switching means comprises a controllable semiconductor switch connected in said series circuit, a gate on said controllable semiconductor switch, and trigger means connected in parallel with said controllable semiconductor switch and to the gate.

3. A firing circuit according to claim 2 wherein said trigger means comprises an operational amplifier having an inverting and a non-inverting input terminal and an output terminal, said output terminal coupled to the gate, and a feedback circuit between said output terminal and said non-inverting input terminal.

4. A firing circuit according to claim 3 wherein one of said input terminals is connected to receive a condition sensitive signal.

5. A firing circuit according to claim 4 further comprising means for providing a reference voltage to the non-inverting input terminal.

6. A firing circuit according to claim 4 further comprising means for providing to the inverting input terminal a sawtooth voltage synchronized with the current pulses.

7. A firing circuit according to claim 1 additionally comprising current limiting means between the power terminal and said capacitor.

8. A firing circuit according to claim 7 wherein said current limiting means comprises a resistor.

9. A firing circuit according to claim 1 in combination with said thyristor, the power and common terminals for series connection in a controlled circuit, said firing circuit controlling firing of the thyristor.

10. A firing circuit according to claim 1 additionally comprising rectifying means in series with said switching means between the capacitor and the common terminal.

* * * * *